United States Patent
Fehrenbach et al.

(10) Patent No.: US 6,701,783 B2
(45) Date of Patent: Mar. 9, 2004

(54) DEVICE AND A PROCESS FOR DETERMINING THE POSITIONS OF BORDER AREAS BETWEEN DIFFERENT MEDIUMS

(75) Inventors: Josef Fehrenbach, Haslach i.K. (DE); Karl Griessbaum, Muehlenbach (DE)

(73) Assignee: Vega Grieshaber KG, Schiltach (DE)

(*) Notice: Subject to any disclaimer, the term of this patent is extended or adjusted under 35 U.S.C. 154(b) by 0 days.

(21) Appl. No.: 09/948,673

(22) Filed: Sep. 10, 2001

(65) Prior Publication Data

US 2002/0053239 A1 May 9, 2002

Related U.S. Application Data

(60) Provisional application No. 60/273,327, filed on Mar. 6, 2001.

(30) Foreign Application Priority Data

Sep. 12, 2000 (DE) .......................... 100 44 888

(51) Int. Cl.[7] .................. G01N 29/18; G01S 13/88
(52) U.S. Cl. .................. 73/290 V; 702/23; 702/50; 702/55; 324/644; 342/124
(58) Field of Search .................. 73/290 R, 290 V; 324/642, 644; 342/22, 118, 124, 175, 195; 702/50, 23, 55

(56) References Cited

U.S. PATENT DOCUMENTS

| | | | |
|---|---|---|---|
| 4,345,106 A | * 8/1982 | Canfield et al. | 373/27 |
| 5,847,567 A | * 12/1998 | Kielb et al. | 324/642 |
| 6,198,424 B1 | * 3/2001 | Diede et al. | 342/22 |
| 6,320,532 B1 | * 11/2001 | Diede | 342/124 |
| 6,477,474 B2 | * 11/2002 | Diede | 702/57 |
| 2002/0177961 A1 | * 11/2002 | Lovegren et al. | 702/50 |

FOREIGN PATENT DOCUMENTS

| | | |
|---|---|---|
| DE | 31 07 444 | 10/1982 |
| DE | 42 33 324 | 4/1994 |
| DE | 40 40 492 | 6/1994 |
| DE | 44 04 745 | 8/1995 |
| DE | 44 19 462 | 12/1995 |
| WO | WO 00/43739 | 7/2000 |
| WO | WO 00/43806 | 7/2000 |

OTHER PUBLICATIONS

Zinke, O., Brunswig, H., "Lehrbuch der Hochfrequenztechnik". Springer–Verlag, Berlin, 1973, pp. 175–185 (in German).

* cited by examiner

Primary Examiner—Hezron Williams
Assistant Examiner—Rose M. Miller
(74) Attorney, Agent, or Firm—Nath & Associates PLLC; Marvin C. Berkowitz

(57) ABSTRACT

A process for determining the position of the border areas between different mediums with the aid of electromagnetic waves, in which process a departing wave which is emitted from a wave transmitter has at least one propagation speed component that is parallel to the normal lines of the border area of the different mediums; the emitted departing wave is at least partially reflected at the border areas; the portions of the reflected returning wave are received by a wave receiver; the travel times between emission of the departing wave and reception of the returning wave are determined; the positions of the border areas are determined from the travel times, with account taken of the different propagation speeds of the wave in the different mediums, while the various portions of the reflected waves in the different mediums (4, 5) are made use of. It is important to take into account here the quadratic relationship of $\epsilon_r$ to the reflection factor r.

20 Claims, 1 Drawing Sheet

Figure 1:
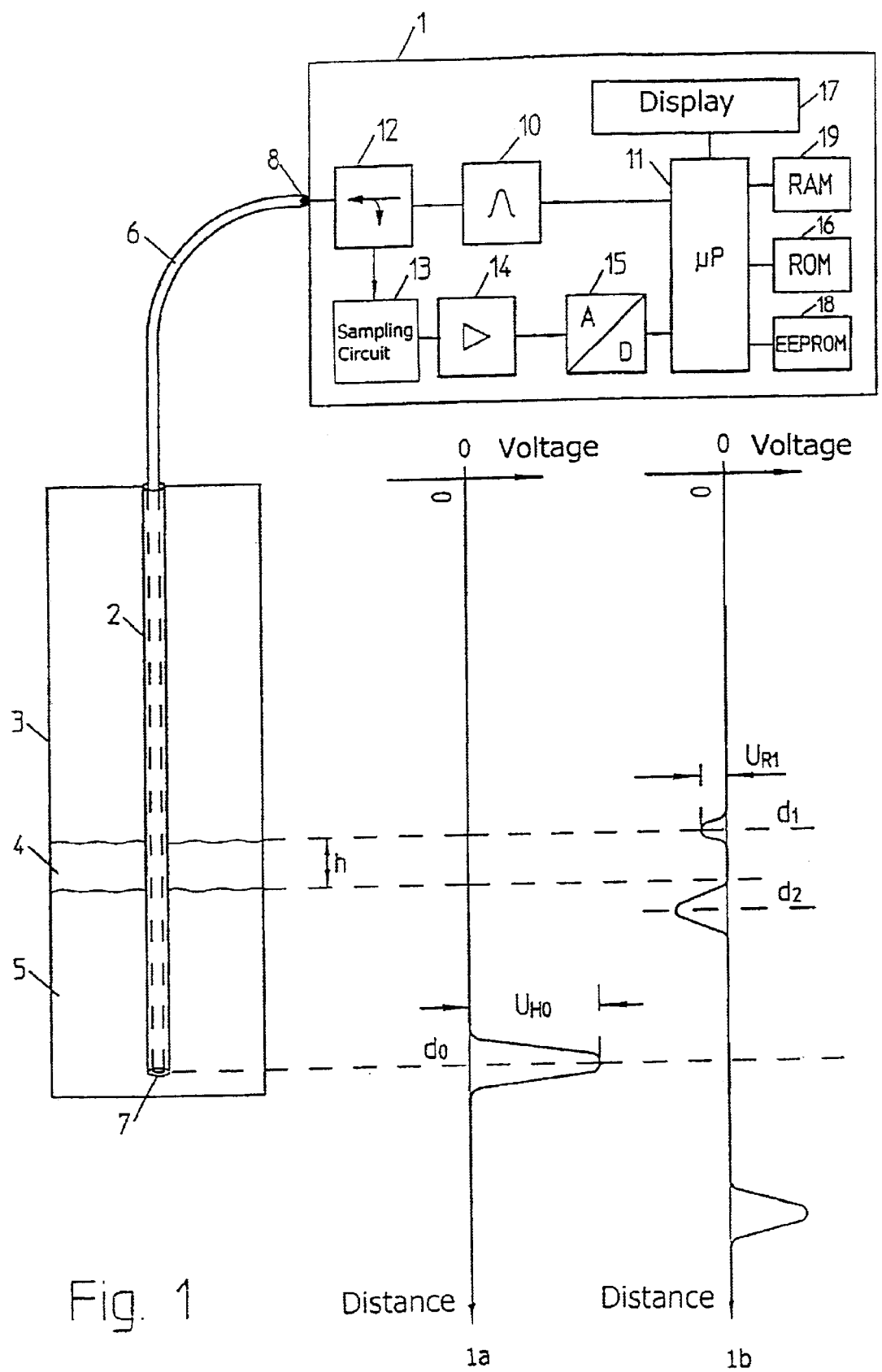

DEVICE AND A PROCESS FOR DETERMINING THE POSITIONS OF BORDER AREAS BETWEEN DIFFERENT MEDIUMS

This application is a nonprovisional of U.S. provisional application No. 60/273,327 filed Mar. 6, 2001.

The present invention relates to a device, as well as a process, for determining the position of the border areas between different mediums, specifically for determining the layer thickness of the uppermost of two superimposed filling materials inside a container by means of electromagnetic waves.

Devices and processes of this kind are known from WO 00/43739 and WO 00/43806, among other sources. To be sure, these documents describe only a functional dependence of the dielectric constants $\epsilon_r$ on the reflection factor, and thus the relation of the voltage that returns on the cable to the departing voltage. Furthermore, neither of these documents discloses attenuation losses in the line.

The present invention is therefore based on the problem of elaborating the processes and devices named in the two documents, in such a way that the border areas between the two mediums can be more precisely determined.

First, however, the technological background of the present invention will be elucidated.

For some time the measurement of filling-levels in industry has employed measuring systems which precisely determine the distance between a sensor and the filling material, as based on the measured transit time of electromagnetic waves that travel from a sensor mounted on the container lid above the filling material to the surface of the filling material and back again. Thus, given the container height, conclusions can be reached about the filling level in the container. Sensors of this kind, which are known as filling-level radar sensors, are based overall on the property exhibited by electromagnetic waves of propagating at constant speed within a homogeneous, non-conductive medium and of being at least partially reflected at the border area between different mediums.

Different radar principles are known to the prior art for determining the wave transit time. The two principally applied methods are pulse radar and FMCW radar. Pulse radar makes use of the pulsed amplitude modulation of the emitted wave and determines the direct period of time between transmission and reception of the pulses. FMCW radar determines the transit time indirectly by transmitting a frequency-modulated signal and ascertaining the difference between the transmitted and the received momentary frequency.

In addition to the different radar methods, various frequency ranges can be used for the electromagnetic waves, depending on the application. For example, there are pulse radar systems with carrier frequencies in the range between 5 and 30 GHz, as well as those that operate in the base band as so-called monopulse radar systems without a carrier frequency.

Furthermore, a series of processes and devices are known which conduct the electromagnetic wave to the surface of the filling material and back again. A basic distinction is made here between a wave emitted into space and one conducted through a cable. Examples of the first type have an antenna that emits the wave with a sufficient degree of focus in the direction of the filling material and then receives it back again. This kind of sensor system is described, e.g., in DE 42 40 492 C2. Radar sensors which guide the electromagnetic wave through a cable to the reflection point and back again are often referred to as TDR (time domain reflectometry) sensors. The cable employed here can have any form customary in high frequency technology. By way of example, single-wire cables, as described in DE 44 04 745, may be mentioned, as well as waveguides, as described in DE 44 19 462.

In addition to the conventional filling-level radar measurements, which determine only the position of the border area between the filling material and the gaseous space above it (air in the usual containers), there are applications in which the goal is determine the position of the bordering layer between two different filling materials, or the layer thickness of the upper layer. Since every border layer between two mediums with different dielectric constants produces an echo, a radar sensor in this case will receive reflections from several points. In addition to the usual reflection at the border area between the gas and the uppermost filling material, an echo will arise at the border between the two filling materials. Under certain circumstances, other echoes may follow from other border areas of filling materials and also from (metallic) container floors. With the appropriate signal evaluation it is possible in any case to clearly identify the echo that results from the reflection at the gas/uppermost filling material border and the one that results from the reflection at the border leading to the next filling material. The sought after layer thickness of the uppermost filling material can be determined from the interval of time that separates the two echoes if the propagation speed of the wave-within this filling material is known. This propagation speed v depends on the dielectric constants $\epsilon_r$ of the filling material and the permeability $\mu_r$ of the filling material. The following formula applies in a calculation based on the propagation speed $V_0$ in a vaccum.

$$v = v_0 \cdot \sqrt{\frac{1}{\epsilon_r \cdot \mu_r}} \qquad \text{(equation 1)}$$

Since the filling materials almost never have a magnetic property the permeability is known ($\mu_r=1$), and the dielectric constant remains the only unknown. In the past it has often been very difficult to determine this constant, since the user of filling-level sensors frequently has no knowledge of the material properties of the filling material. In addition, many containers are alternately filled with materials whose dielectric constants differ, and this necessitates continuous correction through renewed input of the value. Heretofore a further problem has resulted from the fact that the dielectric constant of many mediums is both temperature-dependent and also dependent on the frequency of the electromagnetic wave. Thus even if this material constant is known for a given temperature and a defined frequency range, for example several kilohertz, it can be assumed that for other filling material temperatures and sensor frequencies in the high and maximum frequency range the measuring result based on this predetermined value for the constant will not provide an exact outcome.

With the present invention it is possible to avoid the manual input of the dielectric constants that has heretofore been necessary in measuring separating layers with electromagnetic waves. Instead, a process is proposed, along with a device corresponding to this process, which makes it possible to determine the actual parameters that are dependent on the filling material and that are needed for ascertaining the layer thickness.

Furthermore this invention can be applied when a radar sensor works according to a process like that described in DE 42 33 324. Instead of directly determining the position of a filling level surface from a reflection that under certain circumstances may be relatively weak for filling materials with a low dielectric constant, the echo from the container floor is located, which is usually strong in this case. With a knowledge of the dielectric constants and the distance to the floor for an empty container it is easy to ascertain the filling height of the container.

Whereas the distance to the floor can be measured by a sensor without difficulty in the case of an empty container, or can be input a single time, the description just given applies to the dielectric constant. For radar determination of the filling level according to this method of floor tracking, the present invention also allows input of the dielectric constant to be advantageously replaced by a internal determination of the needed computing factor using a sensor.

With the present invention it is thus possible to determine the dielectric constant from the reflection factor at the border area of the filling material whose dielectric constant is being sought. The reflection factor, in turn, can be determined by measuring the echo amplitude, while incorporating a knowledge of the wave propagation of the electromagnetic wave. The decisive parameter of wave propagation here is the wave resistance $Z_L$. It is defined in general as the location-independent quotient of voltage and current at each point in a cable, and can be calculated as $$Z_L = k \cdot \sqrt{\frac{\mu_0}{\varepsilon_0}} \cdot \sqrt{\frac{\mu_r}{\varepsilon_r}} \qquad \text{(equation 2)}$$

where k is a constant dependent on the wave propagation, and $\mu_0$ and $\varepsilon_0$ are the magnetic and electric field constant. The permeability $\mu_r$ and the dielectric constant $\varepsilon_r$ designate the material constants of the field-conducting medium. The factor $\sqrt{\mu_0/\varepsilon_0}$ designates the free field impedance $Z_0$ of the propagation of a wave in a vacuum and equals 377 Ω.

In the further investigations it is assumed that the wave-conducting medium has no magnetic component and therefore that $\mu_r=1$.

The constant k is dependent on the type of wave propagation, i.e., on, for example, the form in which an electromagnetic wave is conducted. For a radar sensor with a coaxial measuring probe the wave resistance equals $$Z_L := \frac{Z_0}{\pi} \cdot \frac{1}{\sqrt{\varepsilon_r}} \cdot \ln\left(\frac{D_A}{d_I}\right) \qquad \text{(equation 3)}$$

where $D_A$=diameter of the outer conductor $d_I$=diameter of the inner conductor Other examples for wave resistances of conventional measuring probes:

Two-wire Probe:

$$Z_L = \frac{Z_0}{\pi} \cdot \frac{1}{\sqrt{\varepsilon_r}} \cdot \text{arc}\cosh\left(\frac{s}{d}\right) \qquad \text{(equation 4)}$$

where s=spacing of conductor d=dimeter of conductor.

Waveguide with wave in fundamental mode:

$$Z_L = \frac{c}{\sqrt{1-\left(\frac{\lambda_0}{\lambda_c}\right)^2}} \cdot \frac{1}{\sqrt{\varepsilon_r}} \qquad \text{(equation 5)}$$

where c=constant $\lambda_0$=wavelength in air $\lambda_c$=boundary wavelength of air-filled waveguide Finally, for wave propagation in free space the wave resistance is $$Z_L = Z_0 \cdot \frac{1}{\sqrt{\varepsilon_r}} \qquad \text{(equation 6)}$$

Thus given known forms of the wave propagation and conductor design, there is a clear relationship between the wave resistance $Z_L$ and the dielectric constant $\varepsilon_r$ of the propagation medium. In general in can be assumed that the wave resistance is inversely proportional to the square root of $\varepsilon_r$.

If the propagation medium is a gas, a good approximation will result if the dielectric constant of the gas to be put at 1:

$$Z_{gas}=Z_L(\varepsilon_r=1) \qquad \text{(equation 7)}$$

When the propagation medium is a filling material with dielectric constant $\varepsilon_r$, its wave resistance can be expressed as:

$$Z_{L,filling\ mterial} = \frac{1}{\sqrt{\varepsilon_r}} \cdot Z_{Gas} \qquad \text{(equation 8)}$$

The reflection factor of the wave at the border area is defined as the ratio of the amplitudes of the electrical field strengths of the returning wave to the departing wave at the point of reflection. Since an amplitude ratio is involved, the amplitude of the electric field strength of the wave will be replaced by a proportionate measure of voltage U in the following description.

The reflection factor r can then be expressed as the quotient of voltage $U_R$, proportional to the field strength of the returning wave, and voltage $U_H$, proportional to the field strength of the departing wave:

$$r = \frac{U_R}{U_H} \qquad \text{(equation 9)}$$

It is dependent in the following way on the wave resistances $Z_1$, $Z_2$ of the two mediums at a border area:

$$r = \frac{Z_2 - Z_1}{Z_2 + Z_1} \qquad \text{(equation 10)}$$

Thus the following can be equated:

$$\frac{U_R}{U_H} = \frac{Z_2 - Z_1}{Z_2 + Z_1} \qquad \text{(equation 11)}$$

Which is transformed to:

$$Z_2 = \frac{U_H + U_R}{U_H - U_R} \cdot Z_1 \quad \text{(equation 12)}$$

In relation to the gas/filling material border area this equation is:

$$Z_{filling\ material} = \frac{U_H + U_R}{U_H - U_R} \cdot Z_{Gas} \quad \text{(equation 13)}$$

By comparing the two equations 8 and 13 the following relationship is obtained:

$$\frac{1}{\sqrt{\varepsilon_r}} = \frac{U_H + U_R}{U_H - U_R} \quad \text{(equation 14)}$$

or by transforming equation 14:

$$\varepsilon_r = \left(\frac{U_H - U_R}{U_H + U_R}\right)^2 \quad \text{(equation 15)}$$

Thus the sought-after DK value sr can be determined by calculating the amplitudes of the departing and returning wave at the reflection point in accordance with equation 15 if, as assumed, the wave resistance of the conductor is inversely proportional to the square root of the dielectric constants $\varepsilon_r$ of the wave-conducting medium.

For conductors for which this proportionality does not apply the indicated solution can be applied in the same way if the relationship between the change in the dielectric constants of the medium in which the wave is propagated and the change in the corresponding wave resistance is known.

To determine the voltages of the departing and returning wave at the point of reflection the following method is preferred: the voltage of the departing wave can be determined from a measurement of the echo amplitude of a precisely defined, known reflection point. This reflection point may lie within the sensor, e.g., in a known conductor impedance modification in the line between the electronic unit and the probe. With equal success it may be a part of the measuring section within the container, e.g., the total reflection of the wave at the metallic container floor in the case of an empty container or the open-circuited or short-circuited conductor end of the probe in the case of an empty container. When there is a constant transmission voltage in the sensor it is sufficient to measure this amplitude of the departing wave only once (if necessary with factory adjustment of the device) and to permanently store the value. With a knowledge of the sectional attenuations in the wave propagation the amplitude of the departing wave can thus be calculated. The amplitude of the returning wave at the reflection point can be obtained by determining the echo amplitude of the reflection point from the momentarily received echo profile.

The operation of a device according to the invention for determining the border area between two mediums is described below on the basis of the drawings, and the application of the process according to the invention is explained. Shown are:

FIG. 1 a device according to the invention for determining the border areas of two mediums FIG. 1a an exemplary echo profile for an empty container with pulse reflected from the probe end FIG. 1b an exemplary echo profile for a filled container according to FIG. 1 with pulses reflected from different border areas.

The device according to the invention (a coaxial sensor in the example) for determining the border areas between two mediums consists of an electronic unit 1 and, e.g., a coaxial probe 2 that is built into a container 3 and is connected to the electronic unit 1 by means of a connecting cable 6. Located in the container 3 are an upper filling material 4 and a lower filling material 5; it is the role of the sensor to indicate the layer thickness h of the upper filling material 4.

The electronic unit 1 uses as a base, e.g., a microprocessor 11 to which are attached a RAM 19, a ROM 16, an EEPROM 18, and a display 17. Furthermore, the microprocessor 11 is attached to a pulse generator 10, which in turn is connected to a directional coupler 12. The directional coupler 12 forms the attachment point 8 to the connecting cable 6 on one side and is connected to a sampling circuit 13 on the other side. With this circuit the received echo signal is subjected to slow-motion, following a method that is described in DE-A-31 07 444 corresponding to U.S. Pat. No. 4,521,778. For the purpose of disclosure, reference is made to this document in its entirety. Amplification of the slow-motion echo signal is performed in the receiving amplifier 14, which in turn is connected to the microprocessor 11 by way of an A/D transformer 15.

Determination of the layer thickness h of the upper filling material 4 proceeds as follows:

The electronic unit 1, triggered by the microprocessor 11, generates transmission pulses in the pulse generator 10, which are conducted by the directional coupler 12 and the connecting cable 6 to the probe 2. After reflection of the transmission pulses to the wave resistance modifications which exist within the probe 2 and correspond to the border areas between the gas and upper filling material 4 and between the upper filling 4 material and lower filling material 5, and to the probe end 7, the reception pulses are guided by the directional coupler to the sampling circuit 13 and the receiving amplifier 14. After sampling and amplification, as well as analog-digital transformation in the A/D transformer 14, the microprocessor 11 stores the scanned echo profile in the RAM 19. Stored in the ROM 16 is the program according to which the microprocessor introduces a measuring cycle, stores the received echo profile, evaluates it, and after a corresponding calculation displays the layer thickness h on the display 17. To this end, the EEPROM 18 stores information that relates to the device for determining the border areas between two mediums, information that is necessary for arriving at the measuring results according to the invention. When necessary, this information can be recalculated by the invention device during normal operation and written into the EEPROM 18. The information relates to, e.g., the amplitude of the voltage $U_H$ of the departing wave, the propagation attenuation a of the wave, structural data on the invention device, and the relationship between the wave resistance $Z_L$ of the probe and the dielectrical constants ($\varepsilon_r$, filling material) of the (upper and lower) filling material.

In the case of calibration of the invention device at the manufacturer and for an empty container 3, the electronic unit 1 generates an echo profile like that shown in FIG. 1a.

The open-circuited probe end 7 produces a total reflection of the departing wave $U_H$ at a separating distance of $d_0$, which corresponds to the length of the probe. The voltage amplitude $U_{H0}$ of this echo measured in the receiver represents a measure of the voltage $U_H$ of the departing wave, which is permanently stored, as mentioned above.

A partially filled container 3 results in an echo profile like that shown in FIG. 1b. Using this profile, the first and second separating distances $d_1$ and $d_2$, which mark the positions of the border areas of the upper filling material 4, can be calculated. All distances $d_0$, $d_1$, and $d_2$ are first calculated on the basis of the wave propagation in a vacuum or in gas—for which reason the difference between the second distance and the first distance $d_2-d_1$ is not the desired layer thickness h. By measuring the echo voltage amplitude $U_{R1}$ of the reflection at the border of the gas-filling material layer 4 the thickness layer h, together with the other available information, can be calculated from the difference of the distances $d_2-d_1$, in the following manner.

The voltage reflection factor r at the first distance $d_1$ equals $$r = \frac{U_{R1}}{U_{H1}} \quad \text{(Equation 16)}$$

where the voltage amplitude $U_{H1}$ of the departing wave at the gas-upper filling material 4 border can be calculated from the known amplitude value $U_{H0}$ at the point $d_0$, while incorporating the propagation attenuation a (expressed in dB/m).

$$U_{H1} = U_{H0} \cdot 10^{\frac{a \cdot (d_0 - d_1)}{20}} \quad \text{(Equation 17)}$$

Thus, with equation 15 and a knowledge of the voltages $U_{H1}$ and $U_{R1}$ the dielectric constant $\epsilon_r$ of the filling material can be directly calculated according to:

$$\varepsilon_r = \left(\frac{1-r}{1+r}\right)^2 \quad \text{(Equation 18)}$$

where r designates the reflection factor on the conductor and thus the ratio of the returning voltage to the departing voltage. It is clearly evident that the dielectric constant $\epsilon_r$ is not a linear but a quadratic function of r.

The layer thickness h is calculated with the following formula, in keeping with the reduced propagation speed of the wave in the medium 4 according to equation 1

$$h = (d_2 - d_1) \cdot \frac{1}{\sqrt{\varepsilon_r}} \quad \text{(Equation 19)}$$

or through use of equation 15

$$h = (d_2 - d_1) \cdot \left(\frac{U_{H1} + U_{R1}}{U_{H1} - U_{R1}}\right) \quad \text{(Equation 20)}$$

Specification of the voltages must take into account their polarity. If $U_{H0}$ is not determined with an open-circuit measurement but rather a short-circuit measurement, the fact that a short-circuit reverses the polarity of the reflected voltage must be taken into account.

The following numerical example, derived from FIGS. 1a and 1b, will conclude the description of the preferred embodiment of the invention device and process according to FIG. 1:

Measured values:

$d_o$=2.00 m $d_1$=1.20 m $d_2$=1.50 mm $U_{H0}$=750 mV $U_{R1}$=−150 mV

Already known propagation attenuation of the wave on the coaxial probe:

a=−0.1 dB/m

Calculated values according to equations 17 and 20 above:

Voltage amplitude of the departing wave at the gas-upper filling material 4 border: $U_{H1}$=757 mV

Layer thickness: h=0.201 m

The dielectric constant of the filling material 4 in this case equals:

$\epsilon_{r,\, filling\, material}$=2.233

For a very low propagation attenuation a, the value can be ignored; instead $U_{H1}$=$U_{H0}$.

The present invention is not restricted to the described example but, as already stated, can be applied to all conceivable forms of wave propagation when the relationship between the dielectric constant and the wave resistance of propagation is known. In addition, the border area at which the reflection factor r is measured does not necessarily have to be between a gas and a filling material 4. For example, a border area between two different filling materials (4, 5) can be determined by the different propagation speeds of the waves in the different mediums; that is, the portions of the reflected returning wave reflected from each medium are employed to determine the different propagation speeds (v) in the different mediums (4, 5). The different propagation speeds (v) in the different mediums (4, 5) are determined with the aid of the amplitude ratios (r) of the departing wave ($U_{H1}$) to the returing wave ($U_{R1}$), while taking into account a quadratic relationship of the dielectric constants $\epsilon_r$ to the amplitude ratios (r) (=reflection factor). With a completely full container 3, e.g., the wave resistance of the gas-filled probe 2 can be replaced by a known wave resistance in the line 6.

Likewise, in addition to determining the size of the departing wave by means of a total reflection at the short-circuit (e.g., metallic container bottom) or the open-circuit (e.g., at the open probe end 7), any other reflection point within the sensor or along the measuring path is suitable whose reflection factor r is known. The size of the departing wave can be measured once during the calibration process at the manufacturer or intermittently during operation, e.g., when the container 3 is emptied.

The size of the amplitude of the departing wave does not have to be determined as an absolute value, but can be advantageously specified as a relative value which, after the pulse is reflected and passes through the receiver, is scanned as a received amplitude by the A/D transformer. Since the second voltage to be calculated—that of the returning wave—is also available as a relative measure after passing over the same reception path, an advantage results in that amplification changes in the reception path, which may arise due to aging or temperature change, do not at all have a negative effect on the outcome. This is because these potential changes will have an identical effect on the size of both the departing and the returning wave.

For the rest, the radar sensor must not necessarily operate according to the pulse method (TDR sensor); rather the invention is suitable for all other methods that use electromagnetic waves to measure distance.

Finally, the process according to the invention can be used advantageously not only to measure the uppermost layer thickness of superimposed filling materials, but also in the radar method that measures filling levels by tracking the floor echo.

| List of Reference Symbols | |
|---|---|
| 1 | electronic unit |
| 2 | probe |
| 3 | container |
| 4 | upper filling material |
| 5 | lower filling material |
| 6 | connecting cable |
| 7 | probe end |
| 8 | attachment |
| 10 | pulse generator |
| 11 | microprocessor |
| 12 | directional coupler |
| 13 | sampling circuit |
| 14 | receiver amplifier |
| 15 | AD transformer |
| 16 | ROM |
| 17 | Display |
| 18 | EEPROM |
| 19 | RAM |
| $\epsilon_o$ | electric field constant |
| $\epsilon_r$ | dielectric constant |
| $\epsilon_{r, \text{filling material}}$ | dielectric constant of the filling material |
| $\mu_o$ | magnetic field constant |
| $\mu_r$ | permeability |
| $\lambda_c$ | border wavelength of the air-filled waveguide |
| $\lambda_o$ | wavelength in air |
| a | propagation attenuation |
| C | constant |
| d | diameter of the conductor |
| $d_1$ | first separating distance |
| $d_2$ | second separating distance |
| $d_A$ | diameter of the outer conductor |
| $d_r$ | diameter of the inner conductor |
| $d_o$ | separating distance for probe end |
| h | layer thickness of the upper filling material |
| K | constant |
| r | voltage reflection factor |
| s | separating distance of conductor |
| $U_H$ | voltage of departing wave |
| $U_{H0}$ | echo voltage amplitude of the departing waves for reflection at probe end 7 |
| $U_{H1}$ | voltage amplitude of the departing wave at the gas - upper filling material 4 border |
| $U_R$ | voltage of the returning wave |
| $U_{R1}$ | echo voltage amplitude (of the returning wave) for reflection at the gas - upper filling material 4 border |
| v | propagation speed of an electromagnetic wave |
| $v_0$ | propagation speed of an electromagnetic wave in a vacuum |
| $Z_0$ | free field impendance in a vacuum |
| $Z_1$ | wave resistance of the conductor surrounded by the first medium |
| $Z_2$ | wave resistance of the conductor surrounded by the second medium |
| $Z_{gas}$ | wave resistance of the conductor surrounded by gas |
| $Z_L$ | wave resistance |
| $Z_{L, \text{filling material}}$ | wave resistance of the conductor surrounded by the filling material |

What is claimed is:

1. A process for determining a position of at least one border area between different mediums with the aid of electromagnetic waves, comprising:

emitting a departing wave from a wave transmitter, said emitted wave having at least one propagation speed component that is parallel to normal line(s) of the border area of the different mediums;

reflecting the emitted departing wave, at least partially, on at least one border area;

receiving portions of the reflected returning wave by a wave receiver;

determining travel times between emission of the departing wave and reception of the returning wave;

determining a position of at least one border area from the travel times, based on different propagation speeds of the waves in the different mediums, wherein the portions of the reflected returning wave are employed to determine the different propagation speeds (v) in the different mediums (4, 5), the different propagation speeds (v) in the different mediums (4, 5) are determined from the amplitude ratios (r) of the departing wave ($U_{H1}$) to the returning wave ($U_{R1}$) and a quadratic relationship of dielectric constants $\epsilon_r$ to the amplitude ratios (r)(=reflection factor).

2. A process according to claim 1, wherein the dielectric constant $\epsilon_r$ is determined from the given amplitude ratios (r) as a function of the following equation:

$$\varepsilon_r = \left(\frac{1+r}{1-r}\right)^2.$$

3. A process according to claim 2, wherein an amplitude ($U_{H1}$) of the departing wave is determined from measurement of an echo amplitude ($U_{H0}$) at a known and precisely defined reflection point.

4. A process according to claim 1, wherein an amplitude ($U_{H1}$) of the departing wave is fixed in advance.

5. A process according to claim 1, wherein a path attenuation (a) in the mediums is taken into account.

6. The process according to claim 1 further comprising determining layer thicknesses (h) of at least two superimposed filling materials (4, 5) within a container (3).

7. The process according to claim 1 wherein said electromagnetic waves are emitted in a pulse radar method.

8. The process according to claim 1 wherein said electromagnetic waves are emitted in a FMCW radar method.

9. A device for determining positions of border areas between different mediums (4, 5) with the aid of electromagnetic waves, comprising:

a wave transmitter for emitting a departing wave which exhibits at least one propagation speed component that is parallel to normal lines of the border areas of the different mediums and which is at least partially reflected at the border areas;

a wave receiver for receiving portions of a reflected returning wave;

an initial evaluation unit for determining travel times between emission of the departing wave and reception of the reflected returning wave;

a second evaluation unit for determining positions of the border areas from the travel times while taking account of the different propagation speeds of the wave in the different mediums, wherein a third evaluation unit is provided for determining different propagation speeds (v) in the different mediums (4, 5) from the portions ($U_{R1}$) of the reflected returning wave, while the different propagation speeds (v) of the wave in the different mediums (4, 5) are determined with the aid of the amplitude ratios (r) of the departing wave ($U_{H1}$) to the returning wave ($U_{R1}$), while taking into account a quadratic relationship of the dielectric constants $\epsilon_r$ to the amplitude ratios (r)(= reflection factor).

10. A device according to claim 9, wherein the third evaluation unit (11) is designed in such a way that the different propagation speeds (v) of the wave in the different mediums (4, 5) can be determined by using the given amplitude ratios (r) of the departing wave ($U_{H1}$) to the returning wave ($U_{R1}$).

11. A device according to claim 10, wherein a known and precisely defined reflection point is provided, with the result that the amplitude ($U_{A1}$) of the departing wave can be determined from a measurement of the echo amplitude ($U_{H0}$) at this reflection point.

12. A device according to claim 11, wherein the reflection point is a component part of the device.

13. A device according to one of claims 9 to 12, wherein the amplitude ($U_{H1}$) of the departing wave is fixed in advance.

14. A device according to claim 13, wherein the amplitude ($U_{H1}$) of the departing wave is fixed by a manufacturer.

15. A device according to one of claims 9 to 14, wherein a container (3) is provided for receiving various superimposed filling materials (4, 5) and the probe end (7) of a probe (2) which is a component part of the wave transmitter and the wave receiver is basically oriented in the direction of a container floor.

16. A device according to claim 15, wherein the probe is a coaxial probe (2), a one or two-wire probe, or a waveguide.

17. A device according to claim 15 or 16, wherein a reflection point is in a known conductor impedance modification in a connecting line (6) leading to the probe.

18. A device according to claim 15 or 16, wherein the reflection point is on the container floor.

19. A device according to claim 15 or 16, wherein a reflection point is the open-circuit or short-circuit probe end (7).

20. A device according to claim 9, further comprising:

an electronic unit (1) with a microprocessor (11);

a RAM (19) connected to the microprocessor (11);

a ROM (16) connected to the microprocessor (11);

an EEPROM (18) connected to the microprocessor (11);

a display (17) connected to the microprocessor (11);

a pulse generator (10) connected to the microprocessor (11);

a directional coupler (12) connected to the pulse generator (10), said directional coupler (12) having an attachment (8) for transmitting and receiving waves;

a receiving amplifier (14) connected to said directional coupler (12); and an A/D transformer (15) attached to the receiving amplifier (14) and to the microprocessor (11).

* * * * *

UNITED STATES PATENT AND TRADEMARK OFFICE
CERTIFICATE OF CORRECTION

PATENT NO. : 6,701,783 B2
DATED : March 9, 2004
INVENTOR(S) : Fehrenbach et al.

It is certified that error appears in the above-identified patent and that said Letters Patent is hereby corrected as shown below:

Column 11,
Line 8, change "9 to 12" to -- 9 --.
Line 13, change "9 to 14" to -- 9 --.
Line 21, change "15 or 16" to -- 15 --.

Column 12,
Lines 1 and 3, change "15 or 16" to -- 15 --.

Signed and Sealed this

Twenty-second Day of June, 2004

JON W. DUDAS
*Acting Director of the United States Patent and Trademark Office*